United States Patent
Shen et al.

(10) Patent No.: US 11,455,471 B2
(45) Date of Patent: Sep. 27, 2022

(54) SYSTEM AND METHOD FOR EXPLAINING AND COMPRESSING DEEP LEARNING NATURAL LANGUAGE UNDERSTANDING (NLU) MODELS

(71) Applicant: Samsung Electronics Co., Ltd., Suwon-si (KR)

(72) Inventors: Yilin Shen, Santa Clara, CA (US); Hongxia Jin, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 143 days.

(21) Appl. No.: 16/947,258

(22) Filed: Jul. 24, 2020

(65) Prior Publication Data

US 2021/0027020 A1 Jan. 28, 2021

Related U.S. Application Data

(60) Provisional application No. 62/879,316, filed on Jul. 26, 2019.

(51) Int. Cl.
| | | |
|---|---|---|
| *G06F 40/30* | (2020.01) | |
| *G06N 3/08* | (2006.01) | |
| *G06F 40/279* | (2020.01) | |

(52) U.S. Cl.
CPC .......... *G06F 40/30* (2020.01); *G06F 40/279* (2020.01); *G06N 3/08* (2013.01)

(58) Field of Classification Search
CPC .......... G06F 40/30; G06F 40/279; G06N 3/08
See application file for complete search history.

(56) References Cited

U.S. PATENT DOCUMENTS

| | | | |
|---|---|---|---|
| 2018/0046900 A1* | 2/2018 | Dally | G06F 9/30018 |
| 2018/0121799 A1* | 5/2018 | Hashimoto | G06N 3/084 |
| 2018/0268823 A1* | 9/2018 | Miura | G10L 15/32 |
| 2019/0065486 A1* | 2/2019 | Lin | G06F 40/126 |

OTHER PUBLICATIONS

Liu et al., "Attention-Based Recurrent Neural Network Models for Joint Intent Detection and Slot Filling", Carnegie Mellon University, Sep. 2016, 5 pages.

* cited by examiner

*Primary Examiner* — Kevin Ky

(57) ABSTRACT

A method includes obtaining, using at least one processor of an electronic device, a base natural language understanding (NLU) model that includes a word embedding layer, where the word embedding layer is associated with at least one training utterance. The method also includes calculating, using the at least one processor, a regularization loss value for use in a determination of an intent detection loss, where the regularization loss value reveals an effect of word embeddings on intent determination of the training utterance. The method further includes retraining, using the at least one processor, the word embedding layer of the base NLU model using the intent detection loss to obtain a retrained NLU model.

20 Claims, 7 Drawing Sheets

SYSTEM AND METHOD FOR EXPLAINING AND COMPRESSING DEEP LEARNING NATURAL LANGUAGE UNDERSTANDING (NLU) MODELS

CROSS-REFERENCE TO RELATED APPLICATION AND PRIORITY CLAIM

This application claims priority under 35 U.S.C. § 119(e) to U.S. Provisional Patent Application No. 62/879,316 filed on Jul. 26, 2019, which is hereby incorporated by reference in its entirety.

TECHNICAL FIELD

This disclosure relates generally to machine learning systems. More specifically, this disclosure relates to a system and method for explaining and compressing deep learning natural language understanding (NLU) models.

BACKGROUND

As an important component in emerging artificially-intelligent personal assistants, natural language understanding (NLU) models have attracted considerable attention. One example objective of NLU is to identify a user's intent and extract semantic constituents from a natural language utterance, which is often referred to as intent detection and slot filling. NLU models are typically trained using pre-collected data, which usually cannot cover all possible concepts that might be presented to the NLU models during use. Thus, these NLU models usually fail to achieve desirable performance in practice when user expressions are very different from utterances in pre-collected training data. Also, new language concepts can develop quickly over time, and these concepts often cannot be understood by trained NLU models.

SUMMARY

This disclosure provides a system and method for explaining and compressing deep learning natural language understanding (NLU) models.

In a first embodiment, a method includes obtaining, using at least one processor of an electronic device, a base NLU model that includes a word embedding layer, where the word embedding layer is associated with at least one training utterance. The method also includes calculating, using the at least one processor, a regularization loss value for use in a determination of an intent detection loss, where the regularization loss value reveals an effect of word embeddings on intent determination of the training utterance. The method further includes retraining, using the at least one processor, the word embedding layer of the base NLU model using the intent detection loss to obtain a retrained NLU model.

In a second embodiment, an electronic device includes at least one memory configured to store instructions. The electronic device also includes at least one processing device configured when executing the instructions to obtain a base NLU model that includes a word embedding layer, where the word embedding layer is associated with at least one training utterance. The at least one processing device is also configured when executing the instructions to calculate a regularization loss value for use in a determination of an intent detection loss, where the regularization loss value reveals an effect of word embeddings on intent determination of the training utterance. The at least one processing device is further configured when executing the instructions to retrain the word embedding layer of the base NLU model using the intent detection loss to obtain a retrained NLU model.

In a third embodiment, a non-transitory machine-readable medium contains instructions that when executed cause at least one processor of an electronic device to obtain a base NLU model that includes a word embedding layer, where the word embedding layer is associated with at least one training utterance. The medium also contains instructions that when executed cause the at least one processor to calculate a regularization loss value for use in a determination of an intent detection loss, where the regularization loss value reveals an effect of word embeddings on intent determination of the training utterance. The medium further contains instructions that when executed cause the at least one processor to retrain the word embedding layer of the base NLU model using the intent detection loss to obtain a retrained NLU model.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 7, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, natural language understanding (NLU) models are typically trained using pre-collected data, which usually cannot cover all possible concepts that might be presented to the NLU models during use. Thus, these NLU models usually fail to achieve desirable performance in practice when user expressions are very different from utterances in pre-collected training data. Also, new language concepts can develop quickly over time, and these concepts often cannot be understood by trained NLU models. Because of this, it may be useful to provide an explanation of a decision output from an NLU model. Such an explanation can enable NLU error correction (which may be done via user input, one or more algorithms, or a combination of the two) to improve the NLU performance. However, it may be difficult for users to provide feedback to an NLU model when the NLU model behaves incorrectly. Most NLU models are not explainable, and algorithms that automatically improve NLU performance are difficult to design.

State-of-the-art NLU models are based on deep learning technologies. However, deep learning models tend to be "black boxes" due to their multilayer nonlinear structure. In particular, deep learning NLU models are often non-transparent and provide little or no explanations of their decisions. When an NLU model exhibits poor performance in practice, this significantly reduces its usefulness.

This disclosure provides systems and methods for explaining deep learning-based NLU models. These systems and methods can seamlessly integrate with any deep learning-based NLU models. These systems and methods can also compress the NLU model size, which allows the NLU model to be used on personal devices such as mobile smartphones or tablet computers. This is in contrast to many conventional NLU models that have very large sizes and are typically executed on one or more servers, such as in a cloud environment. The disclosed systems and methods can both explain and compress existing NLU models without additional training data with extra explanation labels. In addition, some embodiments of the systems and methods enable both user feedback functionality and data sanitization to improve NLU performance.

Figure 1:
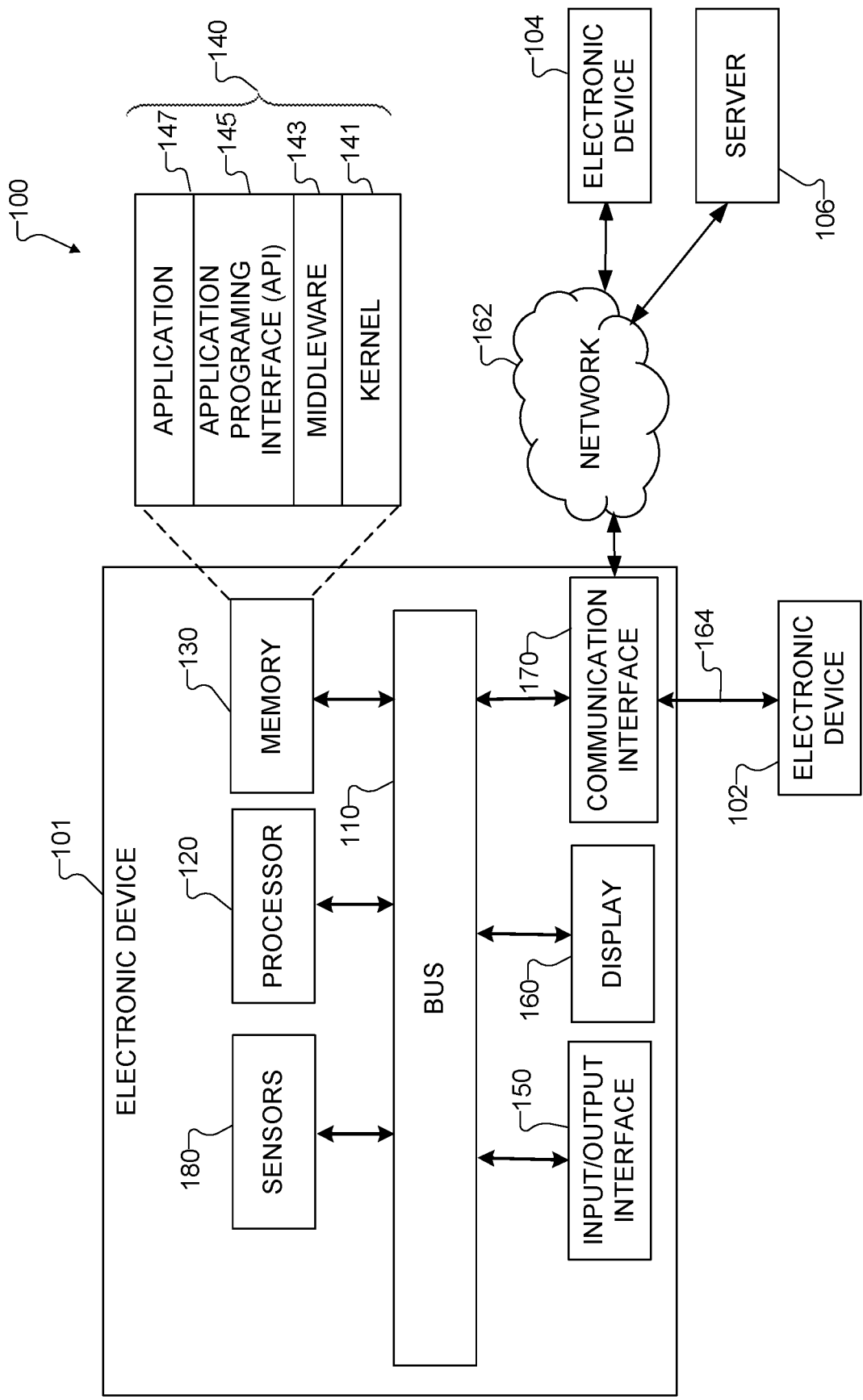
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU).

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more systems and/or methods for explaining and compressing at least one deep learning NLU model, and for improving NLU model performance, as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
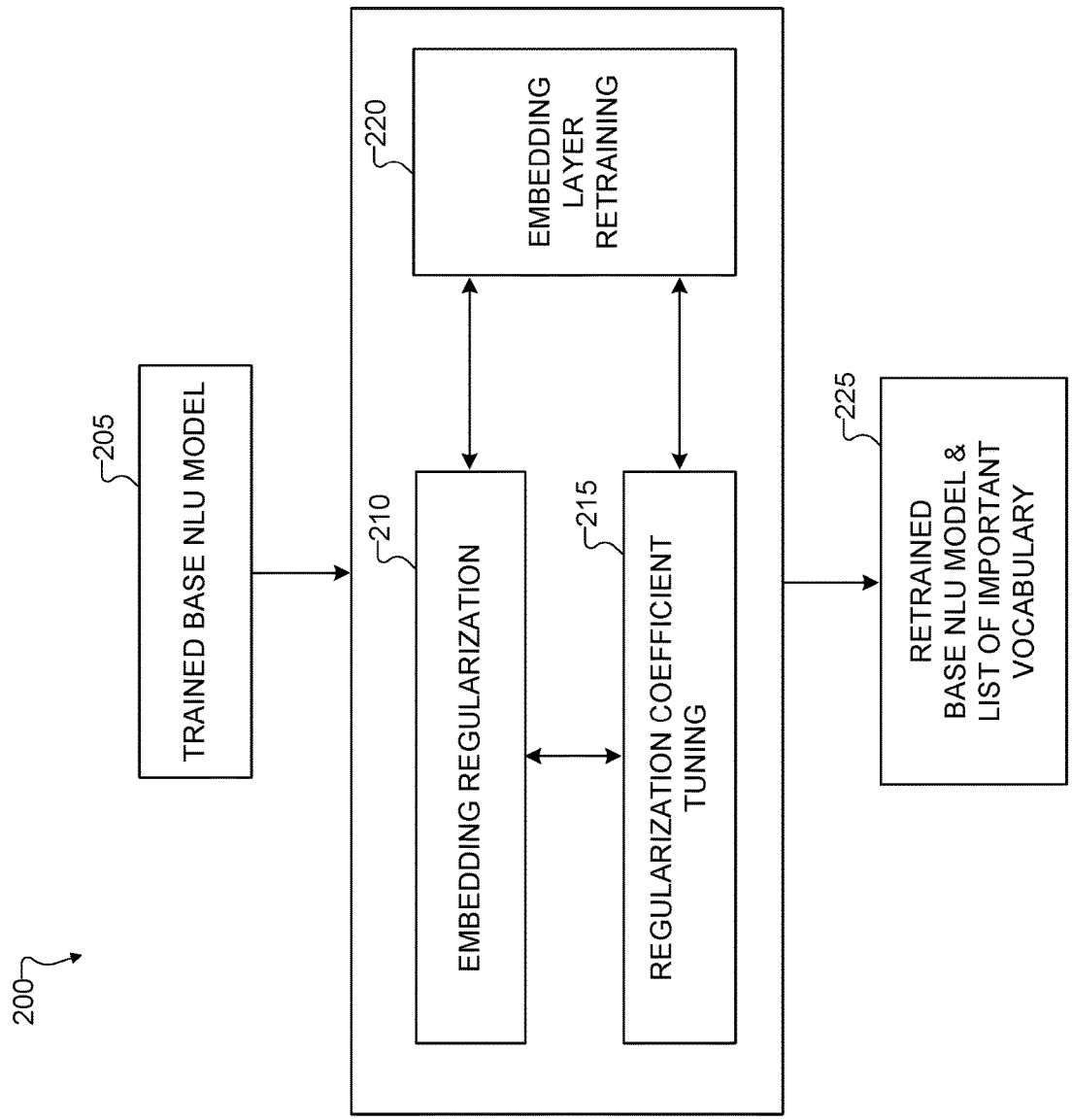
FIG. 2 illustrates an example process for explaining and compressing a natural language understanding (NLU) model according to this disclosure.

FIG. 2 illustrates an example process 200 for explaining and compressing an NLU model according to this disclosure. For ease of explanation, the process 200 is described as being implemented in the electronic device 101 shown in FIG. 1. However, the process 200 could be implemented in any other suitable electronic device and in any suitable system, such as when implemented using the server 106.

As shown in FIG. 2, the process 200 starts with the electronic device 101 obtaining a trained base NLU model 205. Multiple operations, including an embedding regularization operation 210, a regularization coefficient tuning operation 215, and an embedding layer retraining operation 220, are performed on the trained base NLU model 205 as described in greater detail below. The output of the process 200 is a retrained base NLU model 225 that includes a list of important vocabulary for the retrained base NLU model 225.

The trained base NLU model 205 represents an NLU model that has already been trained using a suitable NLU training process. The trained base NLU model 205 can represents any suitable NLU model, such as an NLU model based on Bidirectional Encoder Representations from Transformers (BERT), Recurrent Neural Network (RNN), or the like. Note that various types of NLU models are known and that additional types of NLU models are sure to be developed in the future, and this disclosure is not limited to any particular type of NLU model. The trained base NLU model 205 may have been trained using any suitable NLU training process. Again, note that various types of NLU model training techniques are known and that additional types of NLU model training techniques are sure to be developed in the future, and this disclosure is not limited to any particular type of NLU model training technique.

In retraining the trained base NLU model 205, the electronic device 101 performs the embedding regularization operation 210. One example objective of the embedding regularization operation 210 is to determine a regularization penalty on an intent loss function based on a word embedding matrix, which helps encourage the pruning of unnecessary words from the trained base NLU model 205. Word embedding is a process of converting text into a machine-usable representation, such as one or more vectors. The embedding regularization operation 210 is performed to keep only important vocabulary words that are helpful in recognizing intents from the trained base NLU model 205.

Figure 3:
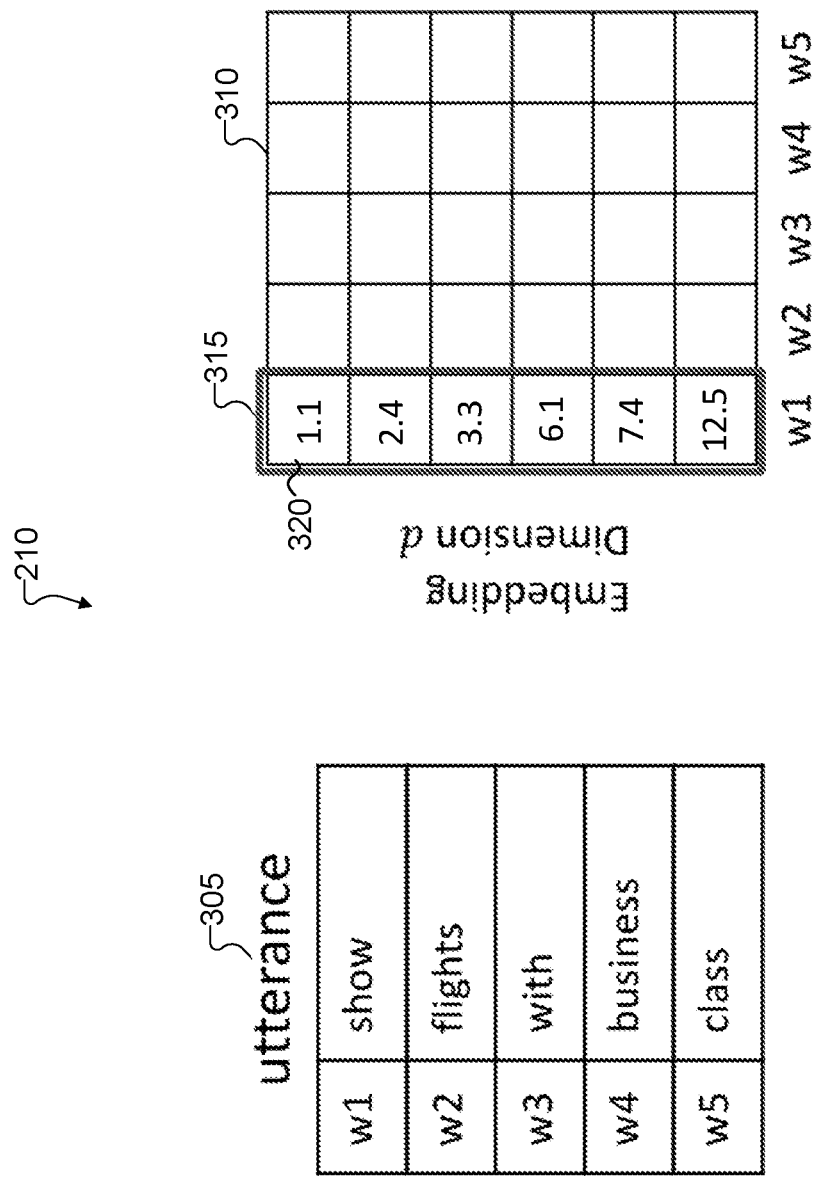
FIG. 3 illustrates additional details of an example embedding regularization operation in the process of FIG. 2 according to this disclosure.

FIG. 3 illustrates additional details of an example embedding regularization operation 210 according to this disclosure. As shown in FIG. 3, a training utterance 305 used to train the trained base NLU model 205 includes the words "show flights with business class." Each word in the training utterance 305 is represented by an embedding vector (denoted w1-w5). Together, the embedding vectors w1-w5 form a word embedding matrix 310 for the training utterance 305 in the trained base NLU model 205. The word embedding matrix 310 includes d rows and W columns, where W is the number of words in the training utterance 305 and d is the embedding dimension (which may be predetermined for the trained base NLU model 205). A vector 315 represents the embedding vector w1, which is the embedding vector for the word "show." The vector 315 includes d embedding weights 320, where each embedding weight 320 represents a value. As shown in FIG. 3, the embedding weights 320 for the vector 315 include the values 1.1, 2.4, 3.3, 6.1, 7.4, and 12.5. However, these values are examples only, and other values are within the scope of this disclosure. The embedding vectors w2-w5 also include d values representing the d embedding weights 320. However, those values are not explicitly shown in the word embedding matrix 310 in FIG. 3. The embedding weights 320 of each vector 315 do not clearly indicate whether or not the corresponding word is important in training. Thus, for some words, it is helpful to set some of the values to zero to indicate that the word is not important as described in greater detail below.

Let E represent the word embedding matrix 310 for the training utterance 305. The embedding regularization operation 210 determines a regularization loss value R(E), which in some embodiments may be expressed as follows:

$$R(E)=\Sigma_{i=1}^{W}\|E_i\|_2 \quad (1)$$

where:

$$\|E_i\|_2=\sqrt{\Sigma_{j=1}^{d}(e_{ij})^2} \quad (2)$$

Here, $e_{ij}$ is the $j^{th}$ embedding weight 320 of the vector 315 for the $i^{th}$ word in the training utterance 305, d is the embedding dimension, W is the number of words in the training utterance 305, and $\|\cdot\|_2$ is the $l_2$-norm (Euclidean length) operation. As indicated by the regularization loss value R(E), the embedding regularization operation 210 can be based on a group lasso regularization. Of course, this is merely one example, and other suitable regularization techniques can be used and are within the scope of this disclosure.

Since the slot filling task of NLU is a sequence labeling task in which all words in an utterance are supposed to be important, the regularization loss value R(E) can be added to an intent detection loss function in order to encourage vocabulary sparsity for both single intent classification and joint learning models. In some embodiments, R(E) can yield sparsity at the word level (meaning all dimensions for a word can be set to zero). Also, in some embodiments, R(E) may not yield sparsity for all dimensions of each word (meaning if any dimension is non-zero, all dimensions may be non-zero). As a result, the regularization loss value R(E) help reveal an effect of word embeddings of the training utterance 305 on intent determination.

The impact of the regularization loss value R(E) can be further controlled by multiplying R(E) by a regularization coefficient λ. The electronic device 101 performs the regularization coefficient tuning operation 215 to determine a value of the regularization coefficient λ. One example objective of the regularization coefficient tuning operation 215 is to tune the value of the regularization coefficient λ to achieve better performance in the embedding regularization operation 210. The regularization term R (E) is capable of affecting the intent detection loss, which affects the performance of the NLU model. Thus, the value of λ can be chosen to avoid negative impacts on the NLU model. For example, a value of λ that is too large would result in all words of the training utterance 305 being deemed unimportant, and no intent would be determined. Similarly, a value for λ that is too small would not provide any regularization, and the training would operate like a conventional training approach. Conventional tuning criteria typically focus on minimizing the estimated prediction error, such as cross-validation. However, such methods are time-consuming and often suffer from a false discovery rate. In contrast, the regularization coefficient tuning operation 215 is much faster.

Figure 4:
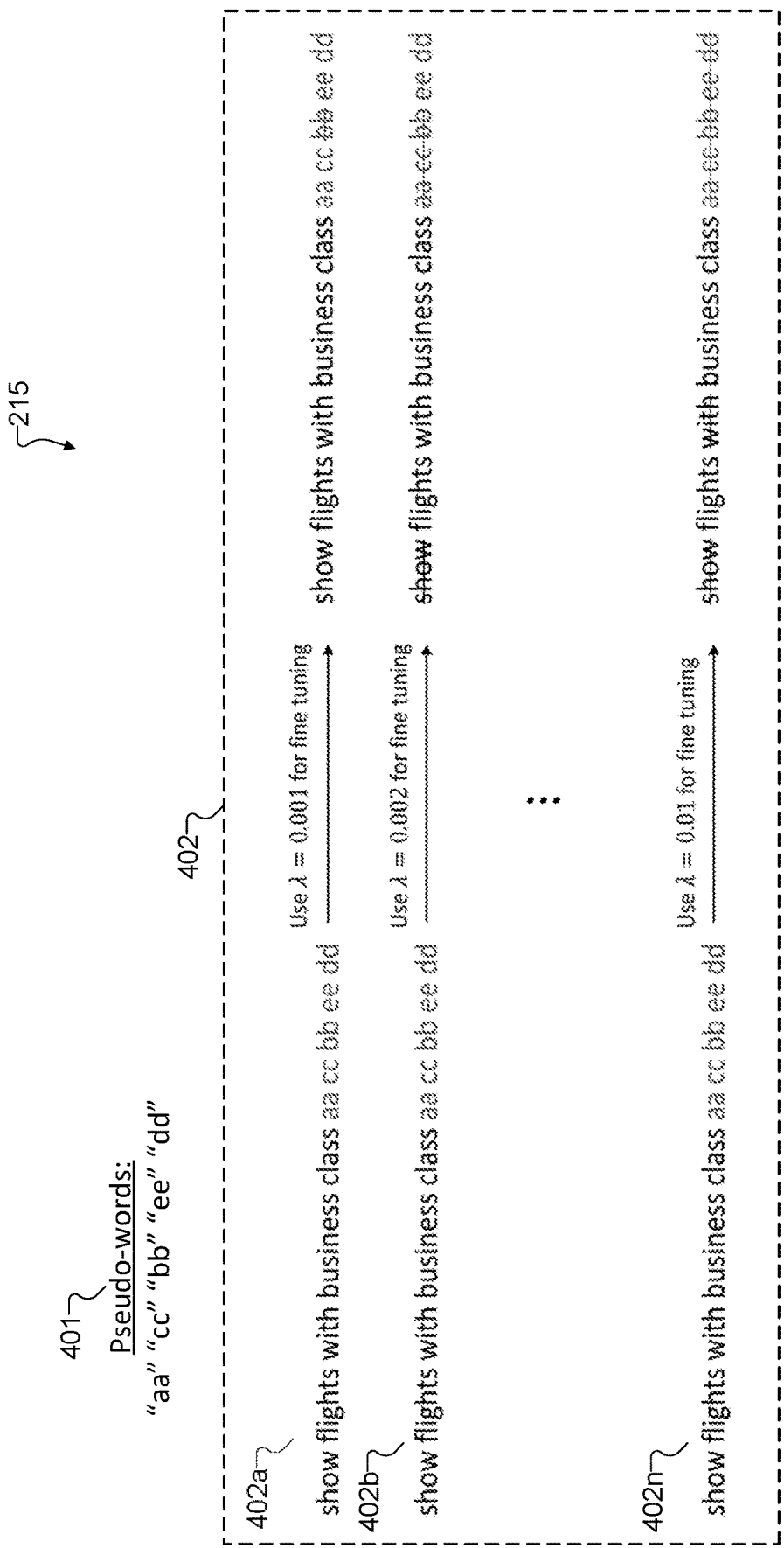
FIG. 4 illustrates additional details of an example regularization coefficient tuning operation in the process of FIG. 2 according to this disclosure.

FIG. 4 illustrates additional details of an example regularization coefficient tuning operation 215 according to this disclosure. As shown in FIG. 4, the regularization coefficient tuning operation 215 includes the electronic device 101 using a set of pseudo words 401 (also referred to as "dummy words"). The set of pseudo words 401 can have the same size as the original training utterance. That is, for a training utterance with a length of 1 words, 1 pseudo words can be randomly generated. In the case of the training utterance 305 (which includes five words), five pseudo words 401 are created, which in this example include "aa," "cc," "bb," "ee," and "dd." The pseudo words 401 are appended to the end of the training utterance 305, which does not affect the sentence syntactics or semantics of the training utterance 305.

The electronic device 101 performs an iterative tuning operation 402 in which the regularization coefficient λ starts with one value and slowly changes with each iteration 402a-402n of the tuning operation 402. During each iteration 402a-402n, the electronic device 101 performs embedding regularization using the training utterance 305 and the pseudo words 401. Each iteration 402a-402n results in none, some, or all of the words of the training utterance 305 and the pseudo words 401 being pruned. As shown in FIG. 4, the tuning operation 402 starts with an iteration 402a in which λ=0.001. In each later iteration 402b-402n, the value of λ increases by 0.001. After the iteration 402a, only the pseudo word 401 "bb" is pruned. After the iteration 402b, "show" of the training utterance 305 and the pseudo words 401 "aa," "cc," and "bb" are pruned. The tuning operation 402 stops at the minimum value of λ where all pseudo words 401 are pruned. In FIG. 4, the iteration 402n using λ=0.01 results in all of the pseudo words 401 being pruned. The words "show" and "with" of the training utterance 305 are also pruned concurrently, and are therefore considered to be unimportant words.

The number of iterations 402a-402n performed in the tuning operation 402 can vary depending on the embodiment. Also, the starting value and increments for λ can vary depending on the embodiment. Thus, the final value of λ may be more or less than 0.01. In general, small values of λ are typically sufficient to prune all pseudo words 401.

The embedding layer of the base NLU model 205 can be retrained using the embedding layer retraining operation 220. As described below, the embedding layer retraining operation 220 uses a modified intent detection loss function to fine-tune the base NLU model 205 in order to adjust the embedding weights of the embedding layer in the base NLU model 205.

Figure 5:
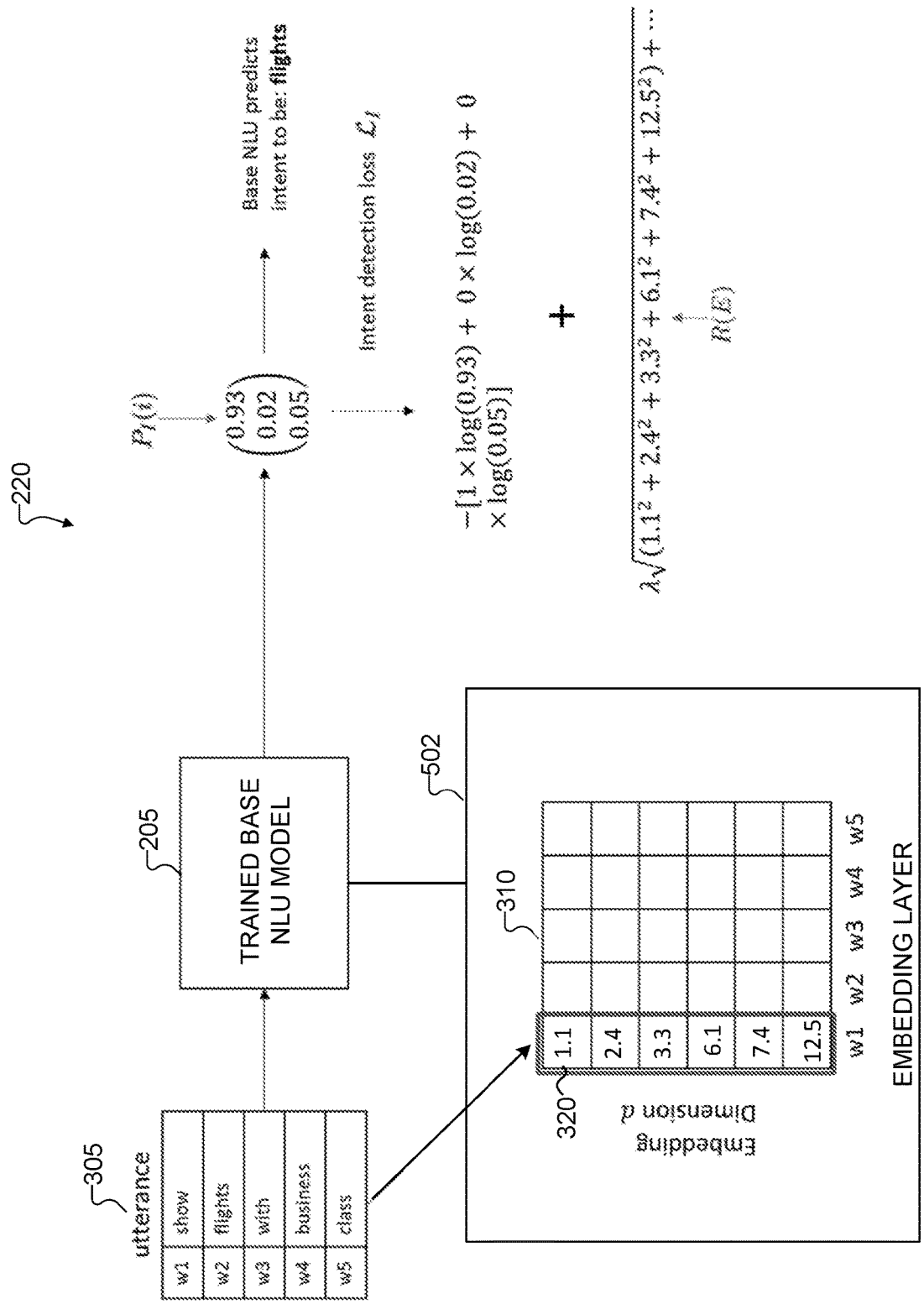
FIG. 5 illustrates additional details of an example embedding layer retraining operation in the process of FIG. 2 according to this disclosure.

FIG. 5 illustrates additional details of an example embedding layer retraining operation 220 according to this disclosure. As shown in FIG. 5, the trained base NLU model 205 receives the training utterance 305 as an input. The trained base NLU model 205 includes an embedding layer 502, which includes the word embedding matrix 310. For this example, it is assumed that there are three recognizable intents (I=3) that the training utterance 305 could be related to: "flights," "restaurants," or "hotels." The recognizable intents are predetermined for the trained base NLU model 205 and can vary as needed or desired.

The training utterance 305 is processed by the trained base NLU model 205, which generates a probability vector $P_I(i)$. The probability vector $P_I(i)$ has multiple values, where each value corresponds to one of the three recognizable intents. As shown in FIG. 5, the probability vector $P_I(i)$ has values of [0.93, 0.02, 0.05], where the value of 0.93 indicates that the trained base NLU model 205 predicts the intent of the training utterance 305 to be "flights."

In some embodiments, the intent detection loss can be determined according to the following modified intent detection loss function:

$$\mathcal{L} \triangleq -\Sigma_{i=1}^{|T|} I(i) \log P_I(i) + \lambda R(E) \quad (3)$$

Here, $I(i)$ is an intent vector corresponding to the probability vector $P_I(i)$, λ is the regularization coefficient, and R(E) is the regularization term. For the training utterance 305, the intent vector $I(i)$ equals [1, 0, 0], where a value of 1 corresponds to the predicted intent "flights," and a value of 0 corresponds to the other intents. The term $-\Sigma_{i=1}^{|T|} I(i) \log P_I(i)$ represents the cross entropy loss for the training utterance 305. The cross entropy loss represents a ground truth for the trained base NLU model 205. As an example, for the training utterance 305, the cross entropy loss could be calculated as −[1×log(0.93)+0×log(0.02)+0×(0.05)]=~0.03.

In general, one example objective in training is to minimize the intent detection loss. Calculating the intent detection loss using only the cross entropy loss does not determine which words are important or unimportant. In accordance with this disclosure, the embedding layer retraining operation 220 introduces the regularization term R(E), which may be calculated as shown in Equations (1) and (2). When a modified intent detection loss function, such as the function of Equation (3), is used in retraining of the embedding layer 502, the resulting output is that one or more of the embedding vectors w1-w5 is set to zero. That is, for an embedding vector w1-w5 that is set to zero, each embedding weight 320 of the vector is set to a zero value. This compresses the model since the zero vectors do not need to be stored or can be stored in a smaller format.

Figure 6A:
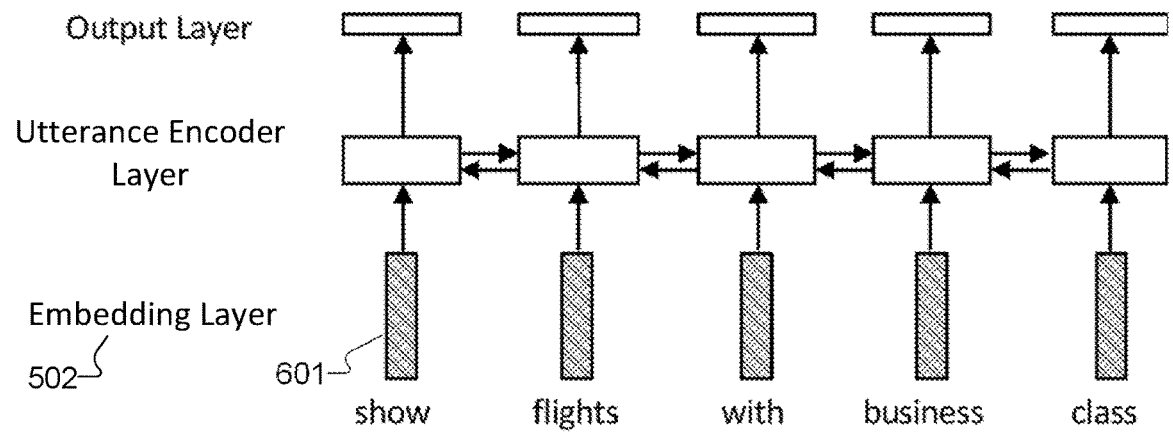
FIGS. 6A and 6B illustrate example results of the embedding layer retraining operation in the process of FIG. 2 according to this disclosure.
Figure 6B:
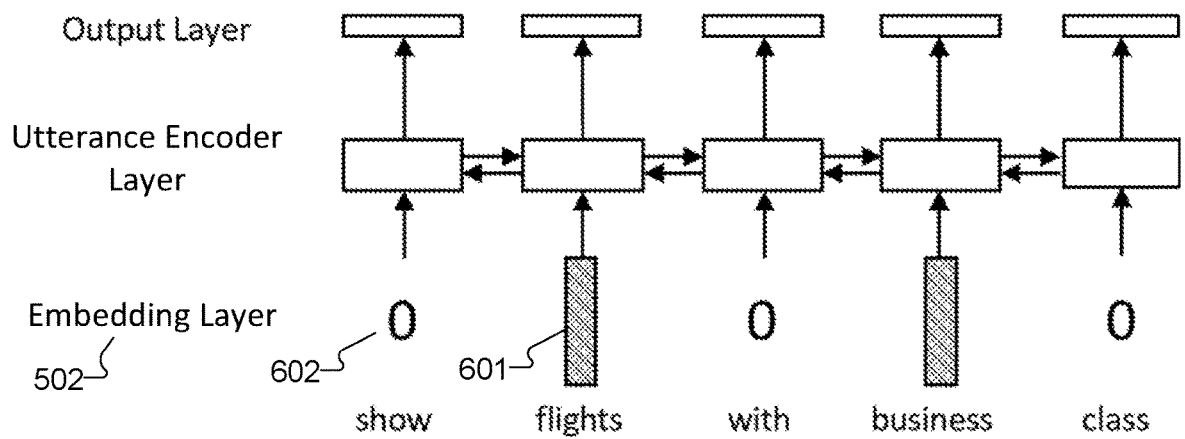

FIGS. 6A and 6B illustrate example results of the embedding layer retraining operation 220 according to this disclosure. In particular, FIG. 6A illustrates the trained base NLU model 205 before the embedding layer retraining operation 220, and FIG. 6B illustrates the trained base NLU model 205 after the embedding layer retraining operation 220.

As shown in FIG. 6A, the embedding layer 502 includes five non-zero embedding vectors 601, one for each word in the training utterance 305. Following the embedding layer retraining operation 220, three of the embedding vectors 601 are set to zero vectors 602. Thus, the base NLU model 205 learns that three words ("show," "with," and "class") are not important. The results shown in FIG. 6B are illustrative of the retrained base NLU model 225, which is obtained from performing the process 200. Another result of the process 200 is a list of important vocabulary for the retrained base NLU model 225. As shown in FIG. 6B, the important vocabulary includes the words "flight" and "business."

To avoid division by zero in the computation of the regularization gradient, some embodiments of the embedding layer retraining operation 220 add a very small number E to the determination of the regularization loss value R (E). For example, Equation (2) can be modified as follows:

$$\|E_i\|_2 \triangleq \sqrt{\epsilon + \Sigma_{j=1}^{d}(e_{ij})^2} \quad (4)$$

where ε can be on the order of $10^{-8}$ or another very small scalar value. Moreover, to stabilize sparsity during training, the embedding weights whose absolute values are smaller than a predefined threshold τ can be zeroed out. In some embodiments, the threshold τ is a predetermined experience value and cannot be trained.

In some embodiments, output from the retrained base NLU model 225 can be presented to a user, and user feedback can be collected based on the explanation of the NLU output. For example, if a user inputs a natural language query or request, the retrained base NLU model 225 can identify the important vocabulary words of the input. After identifying the important vocabulary words, the electronic device 101 can present the natural language input with the identified important words displayed differently from a remainder of the natural language input.

As an example, the user could input (such as via voice or text) the following query to the electronic device 101: "Which airport is closest to Santa Clara Calif.?" After processing the query using the retrained base NLU model 225, the electronic device 101 can present the following information on the display 160 of the electronic device 101:

Information 1: "SJC"

Information 2: "Explain NLU decision 'which airport is CLOSEST to SANTA CLARA CALIFORNIA'"

Information 1 represents the answer to the query determined by the electronic device 101 ("SJC" is the standard code for the San Jose International Airport). Information 2 provides the NLU explanation to the user, where the words that are determined to be important are capitalized. Of course, this is merely one example of how important words may be identified to a user. Other ways of showing the important words, such as highlighting or using a different color, are within the scope of this disclosure.

Additionally or alternatively, the electronic device 101 can show the detected intent (such as "flights") on the display for review by the user. In some embodiments, if the user disagrees with the output of the retrained base NLU model 225, the user can correct one or more important words, intent labels, or a combination of these. For example, the electronic device 101 can provide one or more controls that can be actuated by a user for changing the important words and/or intent labels. Based on the user changes, the retrained base NLU model 225 can be retrained again. This can result in one or more or more changes in the embedding layer 502, such as zero embedding vectors being set to non-zero, non-zero embedding vectors being set to zero, a change in the regularization coefficient k, a change in another value used in retraining, or a combination of these.

In some embodiments, the performance of the trained base NLU model 205 or a new NLU model can be improved using sanitized training data. For example, the electronic device 101 can retrain the embedding layer 502 of the trained base NLU model 205 using standard training data and obtain a set of unimportant words. The electronic device 101 can then create new training data by replacing all unimportant words with a "blank" token (such as "_BLK" or another suitable value representing an unimportant word), and retrain another base NLU model using the new training data. The electronic device 101 then tests the retrained other base NLU model using the original standard training data. The electronic device 101 can then output the sanitized training data as follows. If both intent and slots are identified correctly for an utterance, the electronic device 101 replaces all unnecessary words with the "_BLK" token. However, if the intent is wrong, the electronic device 101 keeps the original utterance as it is. The electronic device 101 may therefore only keep the slot values that are tagged incorrectly, since these may represent the most useful training data.

As described here, the process 200 provides a number of advantages over other NLU training methods. For example, the process 200 enables the electronic device 101 to automatically select important words among all vocabulary in a training dataset. Also, the process 200 does not require any additional labels for the training data, and the retrained base NLU model 225 can be trained using the same training data that is used to train the base NLU model 205. In addition, since many training words are considered unimportant and their corresponding embedding vectors are set to zero, the process 200 compresses the overall NLU model size. The compressed size further enables use of the NLU model on portable user devices, such as mobile smartphones and tablet computers.

The operations and functions shown in FIGS. 2 through 6B can be implemented in an electronic device 101 in any suitable manner. For example, in some embodiments, the operations shown in FIGS. 2 through 6B can be implemented or supported using one or more software applications or other software instructions that are executed by the processor 120 of the electronic device 101. In other embodiments, at least some of the operations shown in FIGS. 2 through 6B can be implemented or supported using dedicated hardware components. In general, the operations shown in FIGS. 2 through 6B can be performed using any suitable hardware or any suitable combination of hardware and software/firmware instructions.

Although FIGS. 2 through 6B illustrate one example of a process 200 for explaining and compressing an NLU model and related details, various changes may be made to FIGS. 2 through 6B. For example, while shown as a specific sequence of operations, various operations shown in FIGS. 2 through 6B could overlap, occur in parallel, occur in a different order, or occur any number of times (including zero times). Also, the specific operations shown in FIGS. 2 through 6B are examples only, and other techniques could be used to perform each of the operations shown in FIGS. 2 through 6B.

Figure 7:
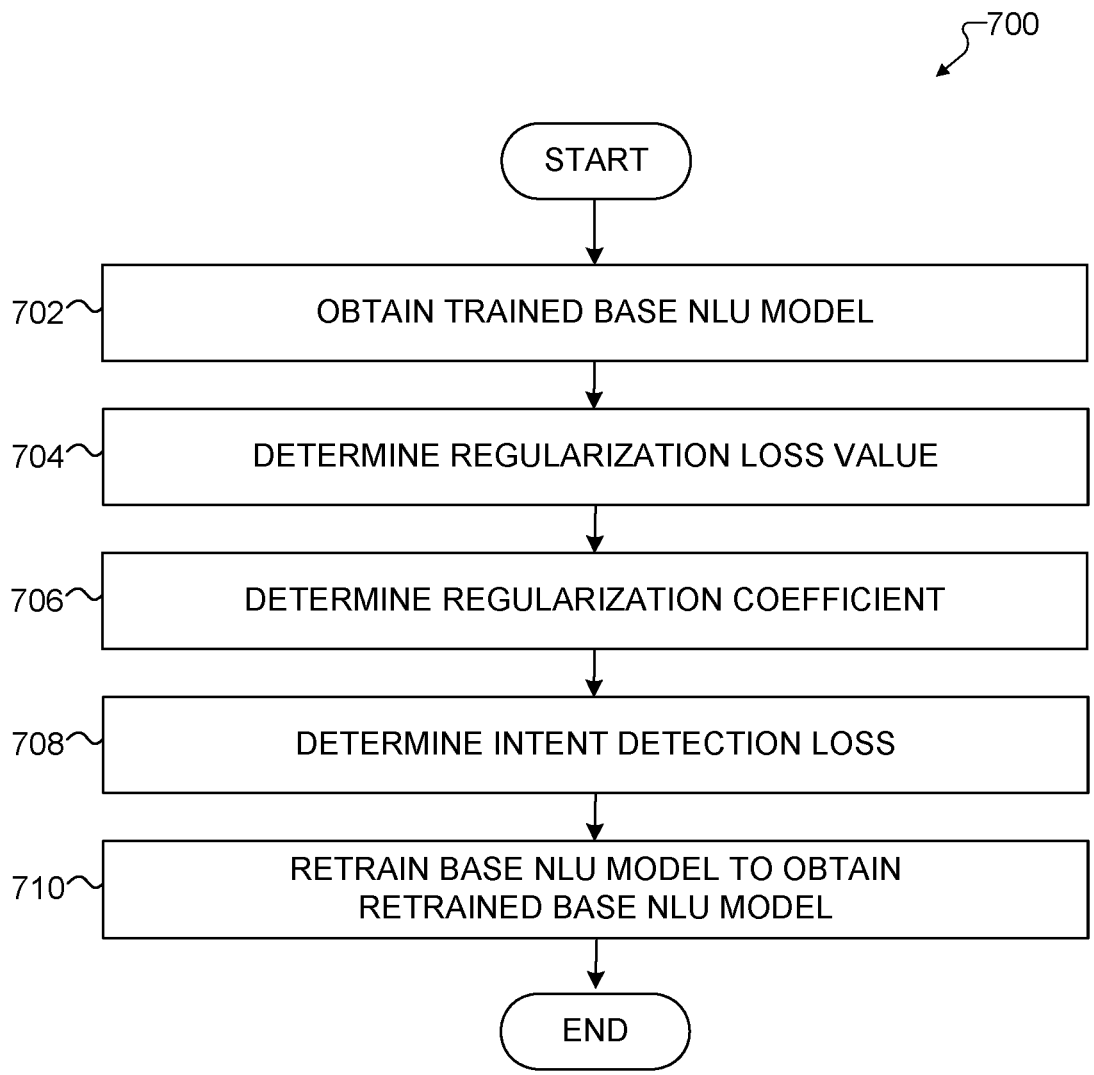
FIG. 7 illustrates an example method for explaining and compressing an NLU model according to this disclosure.

FIG. 7 illustrates an example method 700 for explaining and compressing an NLU model according to this disclosure. For ease of explanation, the method 700 shown in FIG. 7 is described as involving the use of the process 200 shown in FIGS. 2 through 6B and the electronic device 101 shown in FIG. 1. However, the method 700 shown in FIG. 7 could be used with any other suitable electronic device and in any suitable system.

As shown in FIG. 7, a trained base NLU model that includes a word embedding layer is obtained at an electronic device at step 702. The word embedding layer is associated with at least one training utterance. This could include, for example, the electronic device 101 obtaining the trained base NLU model 205, which includes the embedding layer 502 associated with the training utterance 305.

A regularization loss value is calculated for use in a determination of an intent detection loss at step 704. This could include, for example, the electronic device 101 calculating the regularization loss value R(E), such as by using Equations (1) and (2) above. The regularization loss value reveals an effect of word embeddings on intent determination of the training utterance. The regularization loss value can be calculated based on a plurality of embedding weights of a word embedding matrix associated with the at least one training utterance.

A regularization coefficient is determined for use in the determination of the intent detection loss at step 706. This could include, for example, the electronic device 101 determining the regularization coefficient λ. In some embodiments, this could include the electronic device 101 adding a plurality of pseudo words to the at least one training utterance, where (i) the pseudo words are randomly generated and (ii) a quantity of the pseudo words is equal to a quantity of words in the at least one training utterance. This could also include the electronic device 101 performing an iterative process in which the base NLU model is trained in multiple iterations, where each iteration includes an updated value for the regularization coefficient. The iterative process can be performed until the pseudo words are pruned from the at least one training utterance.

The intent detection loss is determined based on a cross entropy loss, the regularization coefficient, and the regularization loss value at step 708. This could include, for example, the electronic device 101 determining the intent detection loss according to the modified intent detection loss function of Equation (3) above. The word embedding layer of the base NLU model is retrained using the intent detection loss to obtain a retrained NLU model at step 710. This could include, for example, the electronic device 101 performing the embedding layer retraining operation 220 to obtain the retrained base NLU model 225. The retrained base NLU model 225 can identify one or more important words and one or more unimportant words in the training utterance 305.

Once the retrained NLU model is obtained at step 710, the retrained NLU model can be used to determine an intent of a natural language input. For example, one or more words of a natural language input could be identified as important words using the retrained NLU model. In some embodiments, the natural language input could be presented on a display of an electronic device (e.g., the electronic device 101, the electronic device 102, or the electronic device 104), with the important words identified differently from a remainder of the natural language input. For example, the important words could be displayed in a different format on a display 160.

Although FIG. 7 illustrates one example of a method 700 for explaining and compressing an NLU model, various changes may be made to FIG. 7. For example, while shown as a series of steps, various steps in FIG. 7 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining, using at least one processor of an electronic device, a base natural language understanding (NLU) model comprising a word embedding layer, the word embedding layer associated with at least one training utterance;
    calculating, using the at least one processor, a regularization loss value, wherein the regularization loss value reveals an effect of word embeddings on intent determination of the at least one training utterance;
    determining, using the at least one processor, a regularization coefficient by (i) adding a plurality of pseudo words to the at least one training utterance and (ii) performing an iterative process in which the base NLU model is trained in multiple iterations, each iteration associated with an updated value for the regularization coefficient;
    determining, using the at least one processor, an intent detection loss based on a cross entropy loss, the regularization coefficient, and the regularization loss value; and
    retraining, using the at least one processor, the word embedding layer of the base NLU model using the intent detection loss to obtain a retrained NLU model.

2. The method of claim 1, wherein the pseudo words are randomly generated and a quantity of the pseudo words is equal to a quantity of words in the at least one training utterance.

3. The method of claim 2, wherein the iterative process is performed until the pseudo words are pruned from the at least one training utterance.

4. The method of claim 1, wherein the regularization loss value is calculated based on a plurality of embedding weights of a word embedding matrix associated with the at least one training utterance.

5. The method of claim 4, further comprising:
    setting, using the at least one processor, at least one of the embedding weights to zero when the at least one embedding weight has an absolute value smaller than a predetermined threshold.

6. The method of claim 1, further comprising:
    allowing identification of one or more words of a natural language input based on an importance of the one or more words in relation to determining an intent of the natural language input using the retrained NLU model, wherein the one or more words are configured to be presented on a display differently from a remainder of the natural language input.

7. The method of claim 1, wherein the cross entropy loss represents a ground truth for the base NLU model.

8. An electronic device comprising:
    at least one memory configured to store instructions; and
    at least one processing device configured when executing the instructions to:
        obtain a base natural language understanding (NLU) model comprising a word embedding layer, the word embedding layer associated with at least one training utterance;
        calculate a regularization loss value, wherein the regularization loss value reveals an effect of word embeddings on intent determination of the at least one training utterance;
        determine a regularization coefficient by (i) adding a plurality of pseudo words to the at least one training utterance and (ii) performing an iterative process in which the base NLU model is trained in multiple iterations, each iteration associated with an updated value for the regularization coefficient;
        determine an intent detection loss based on a cross entropy loss, the regularization coefficient, and the regularization loss value; and
        retrain the word embedding layer of the base NLU model using the intent detection loss to obtain a retrained NLU model.

9. The electronic device of claim 8, wherein the pseudo words are randomly generated and a quantity of the pseudo words is equal to a quantity of words in the at least one training utterance.

10. The electronic device of claim 9, wherein the at least one processing device is configured to perform the iterative process until the pseudo words are pruned from the at least one training utterance.

11. The electronic device of claim 8, wherein the at least one processing device is configured to calculate the regularization loss value based on a plurality of embedding weights of a word embedding matrix associated with the at least one training utterance.

12. The electronic device of claim 11, wherein the at least one processing device is further configured to:
    set at least one of the embedding weights to zero when the at least one embedding weight has an absolute value smaller than a predetermined threshold.

13. The electronic device of claim 8, wherein the at least one processing device is further configured to:

allow identification of one or more words of a natural language input based on an importance of the one or more words in relation to determining an intent of the natural language input using the retrained NLU model, wherein the one or more words are configured to be presented on a display differently from a remainder of the natural language input.

14. The electronic device of claim 8, wherein the cross entropy loss represents a ground truth for the base NLU model.

15. A non-transitory machine-readable medium containing instructions that when executed cause at least one processor of an electronic device to:
- obtain a base natural language understanding (NLU) model comprising a word embedding layer, the word embedding layer associated with at least one training utterance;
- calculate a regularization loss value, wherein the regularization loss value reveals an effect of word embeddings on intent determination of the at least one training utterance;
- determine a regularization coefficient by (i) adding a plurality of pseudo words to the at least one training utterance and (ii) performing an iterative process in which the base NLU model is trained in multiple iterations, each iteration associated with an updated value for the regularization coefficient;
- determine an intent detection loss based on a cross entropy loss, the regularization coefficient, and the regularization loss value; and
- retrain the word embedding layer of the base NLU model using the intent detection loss to obtain a retrained NLU model.

16. The non-transitory machine-readable medium of claim 15, wherein the pseudo words are randomly generated and a quantity of the pseudo words is equal to a quantity of words in the at least one training utterance.

17. The non-transitory machine-readable medium of claim 16, wherein the instructions cause the at least one processor to perform the iterative process until the pseudo words are pruned from the at least one training utterance.

18. The non-transitory machine-readable medium of claim 15, wherein the instructions cause the at least one processor to calculate the regularization loss value based on a plurality of embedding weights of a word embedding matrix associated with the at least one training utterance.

19. The non-transitory machine-readable medium of claim 18, wherein the instructions when executed further cause the at least one processor to:
- set at least one of the embedding weights to zero when the at least one embedding weight has an absolute value smaller than a predetermined threshold.

20. The non-transitory machine-readable medium of claim 15, wherein the cross entropy loss represents a ground truth for the base NLU model.

* * * * *